P. A. ASBJELD.
DIRIGIBLE AUTOMOBILE HEADLAMP.
APPLICATION FILED MAR. 25, 1920.
1,406,955.
Patented Feb. 14, 1922.
2 SHEETS—SHEET 1.
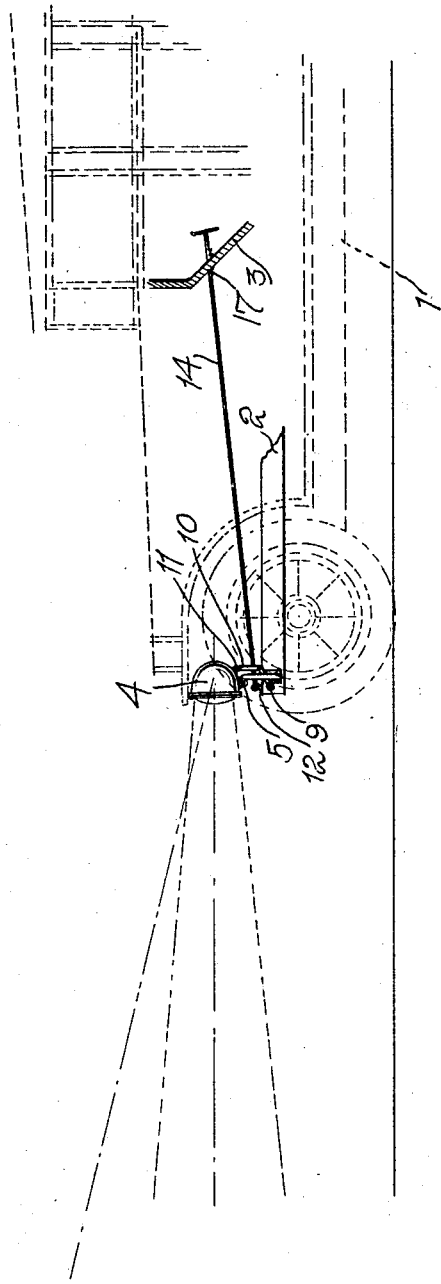
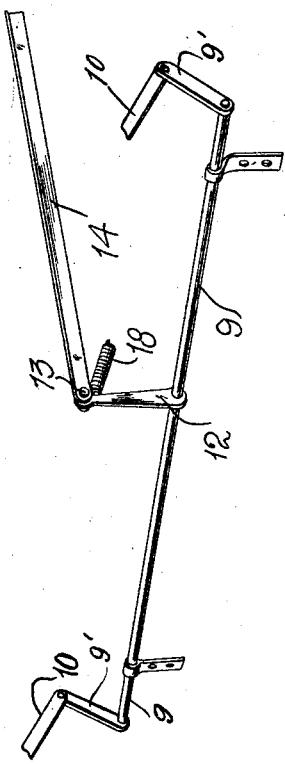
Inventor
Peder A. Asbjeld
By Franklin A. Hough
Attorney

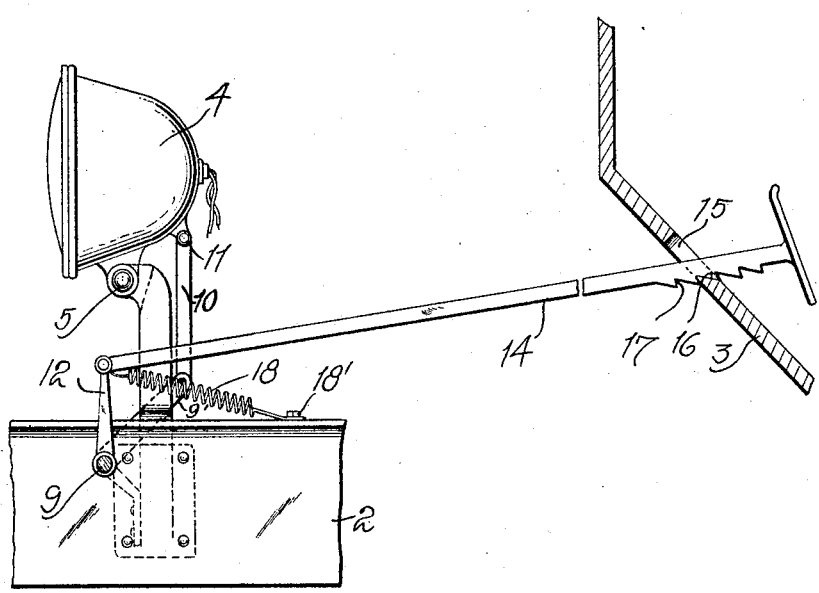
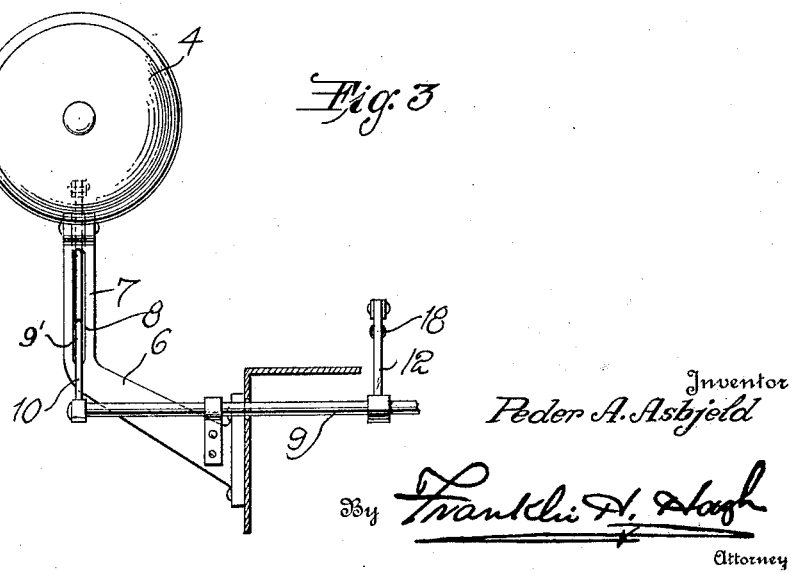

UNITED STATES PATENT OFFICE.

PEDER A. ASBJELD, OF BERESFORD, SOUTH DAKOTA.

DIRIGIBLE AUTOMOBILE HEADLAMP.

1,406,955.  Specification of Letters Patent.  Patented Feb. 14, 1922.

Application filed March 25, 1920. Serial No. 368,614.

*To all whom it may concern:*

Be it known that I, PEDER A. ASBJELD, a citizen of the United States, residing at Beresford, in the county of Union and State of South Dakota, have invented certain new and useful Improvements in Dirigible Automobile Head lamps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of dirigible head lamps for automobiles, and tractors, controllable by the foot of the operator; and the invention resides in tiltable head lamps and pedal-operated mechanism for tilting said lamps on a horizontal axis so as to incline said lamps from the normal horizontal position thereof to an inclined position so as to throw the light rays downward, out of the eyes of the operator of a second automobile coming in the opposite direction, so that said operator will not be blinded, and thus reduce the danger of accidents.

The invention in its preferred form is clearly exemplified in the accompanying drawings, in which:

Figure 1 is a view in side elevation of the mechanism of my invention installed on an automobile, the latter being shown mostly in dotted lines, and partially in section;

Figure 2 is a fragmentary detail view of a portion of the automobile, showing my invention on an enlarged scale, applied thereto;

Figure 3 is also a fragmentary view of a portion of the automobile showing fragmentarily in front elevation, the improvements of my invention, and Figure 4 is a fragmentary detail view in perspective of a portion of said mechanism.

Referring now in detail to the drawings:

1 designates an automobile of any preferred or desired construction, and forming no part of my invention. 2 designates a portion of the frame of the automobile, and 3 the dash-board.

4 designates the two head lamps of the automobile, which may be of any preferred or desired construction. Each of said lamps is pivotally supported, as shown at 5, on a bracket 6, secured to the portion 2 of the automobile frame, each of said brackets preferably comprising an upwardly inclined portion terminating in an angular vertical extension 7, which is provided with a longitudinally extending slot 8, for a purpose presently appearing.

Rotatably supported in the two side members 2 of the frame of the automobile is a bell crank rock shaft 9 provided with arms 9'. Secured to the ends of the arms 9' are links 10, 10. Said arms 9' project through the slots 8 in the brackets 6, pivotally connected at their upper ends, as shown at 11 to the lamps 4 at a point thereon in the rear of and somewhat above the pivot 5, as shown in Figure 2.

Fast on the shaft 9, preferably intermediate the ends thereof, is a crank 12, pivotally secured to the free end of which, as shown at 13, is a foot pedal lever 14, extending rearward and projecting through an opening 15 in the dash-board 3 of the automobile. The lower wall of the opening 15 is inclined, as shown at 16, and the lower side of the lever 14, toward the rear end of said lever, is provided with a series of longitudinally extending ratchet teeth 17, any one of which is adapted to engage the inclined wall 16 of the opening 15, and thereby hold the lever 14 against retrograde movement after having been moved in the direction to shift the lamps 4 from the horizontal position to an inclined position.

A tension element 18, in this instance, a retractile coiled spring, is secured at one end of the crank 12, toward the upper end thereof, and at its other end, as shown at 18', to the automobile frame and functions to automatically return the lamps to normal horizontal position after the foot lever 14 has been raised to disengage the ratchet teeth 17 from the inclined wall 16 of the opening 15.

In operation, it will be seen that when the operator pushes against the lever 14 with his foot, the lever will be moved forward, thereby moving the rock shaft 9 through the arc of a revolution by means of the crank connection 12. The movement of the shaft 9 will be imparted to the lamps 4 through the medium of the rocker arms 9' and links 10, 10, thereby tilting the lamps 4 from a horizontal position to an inclined position, whereby the light rays are thrown downward upon the ground and out of the eyes of an operator in an approaching automobile.

What I claim to be new is:

The combination of a rigid bracket, a lamp housing, a centrally positioned lug beneath said housing pivoted to the bracket, a second lug in the rear of the first-mentioned lug, a link pivoted to the last-mentioned lug, a foot pedal, a push rod connected to the pedal, a rock shaft, and means connecting the rock shaft with the push rod and with the link.

In testimony whereof I hereunto affix my signature.

PEDER A. ASBJELD.